United States Patent
Zachmeier et al.

(10) Patent No.: US 7,527,280 B1
(45) Date of Patent: May 5, 2009

(54) SCISSOR HITCH

(75) Inventors: Leo Zachmeier, Mandan, ND (US); Tony Wald, Mandan, ND (US)

(73) Assignee: Leo P. Zachmeier, Mandan, ND (US)

( * ) Notice: Subject to any disclaimer, the term of this patent is extended or adjusted under 35 U.S.C. 154(b) by 438 days.

(21) Appl. No.: 11/062,916

(22) Filed: Feb. 22, 2005

(51) Int. Cl.
*B60D 1/46* (2006.01)

(52) U.S. Cl. .................................. 280/490.1; 414/563

(58) Field of Classification Search ............... 414/481, 414/483, 563; 280/490.1, 489
See application file for complete search history.

(56) References Cited

U.S. PATENT DOCUMENTS

| | | | | |
|---|---|---|---|---|
| 2,784,857 A * | 3/1957 | Duffy | | 414/481 |
| 2,823,817 A * | 2/1958 | Holsclaw | | 414/483 |
| 3,018,906 A * | 1/1962 | Franklin | | 414/476 |
| 3,460,696 A * | 8/1969 | Owen, Jr. | | 414/483 |
| 3,945,521 A * | 3/1976 | Decker | | 414/483 |
| 4,003,583 A * | 1/1977 | Stanzel | | 280/43.22 |
| 4,490,089 A * | 12/1984 | Welker | | 414/483 |
| 4,993,910 A * | 2/1991 | Rigg | | 414/563 |
| 5,727,920 A * | 3/1998 | Hull et al. | | 414/476 |
| 5,730,572 A * | 3/1998 | Scheuren | | 414/24.5 |
| 5,782,514 A * | 7/1998 | Mann | | 293/118 |
| 5,908,280 A * | 6/1999 | Allison | | 414/563 |
| 6,357,991 B1 * | 3/2002 | Hamlett | | 414/538 |
| 6,733,219 B1 * | 5/2004 | Floe | | 410/3 |
| 6,923,452 B1 * | 8/2005 | Zachmeier et al. | | 280/6.151 |
| 6,964,241 B1 * | 11/2005 | Krebs | | 114/230.1 |
| 2002/0110442 A1 * | 8/2002 | Hurlburt | | 414/482 |
| 2006/0045693 A1 * | 3/2006 | Elliot et al. | | 414/481 |

OTHER PUBLICATIONS http://www.zachmeiermfg.com/fishhouse.html; Zack Shack® Fish House by Zachmeier MFG Inc., Nov. 30, 2007.*
http://web.archive.org/web/20040202062957/http://zachmeiermfg.com/fishhouse.html; Introducing Zachmeier's Fish House, Feb. 2, 2004.*

* cited by examiner

*Primary Examiner*—Saúl J Rodríguez
*Assistant Examiner*—Joshua I Rudawitz

(57) ABSTRACT

A scissor hitch assembly for use with a ground-level loading trailer which allows the ball hitch coupler to remain attached to the towing vehicle while the ground-level loading trailer is in its lowered or ground-level position. When in its travel position, the scissor hitch assembly is secured through a travel pin. When the ground-level loading trailer is to be lowered, a single individual can simply remove the travel pin from the scissor hitch assembly and allow a portion of the scissor hitch assembly to slowly lower through the assistance of gas springs.

8 Claims, 4 Drawing Sheets

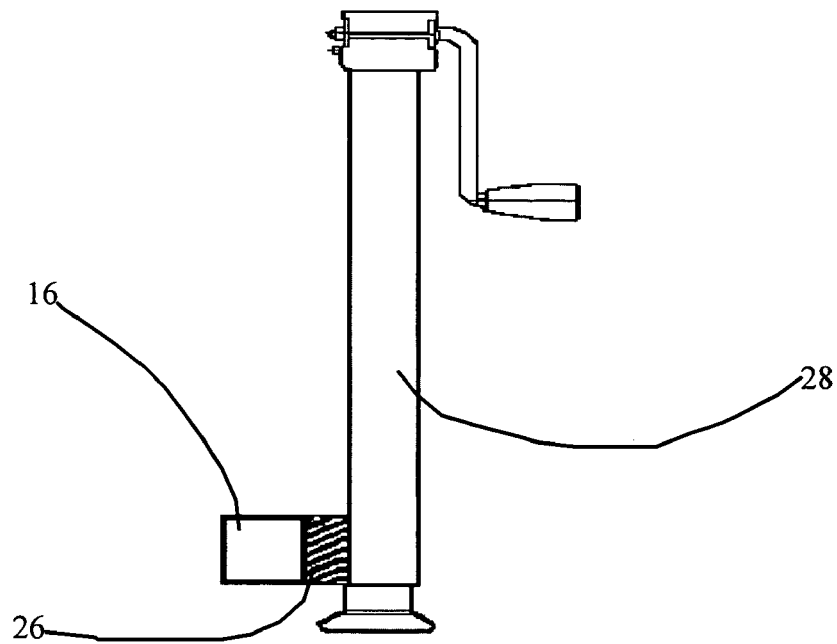
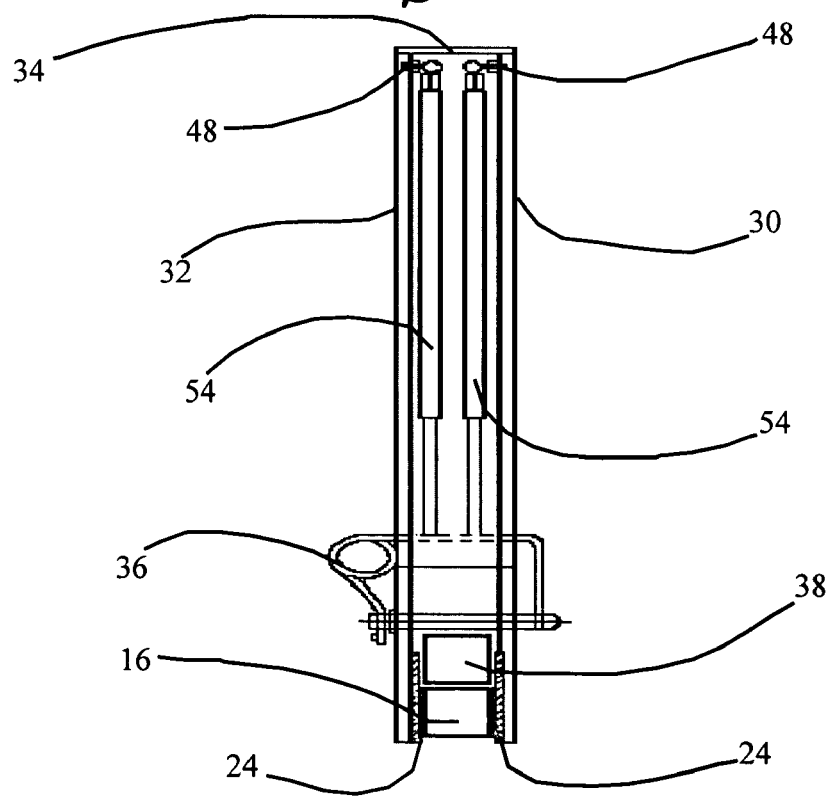

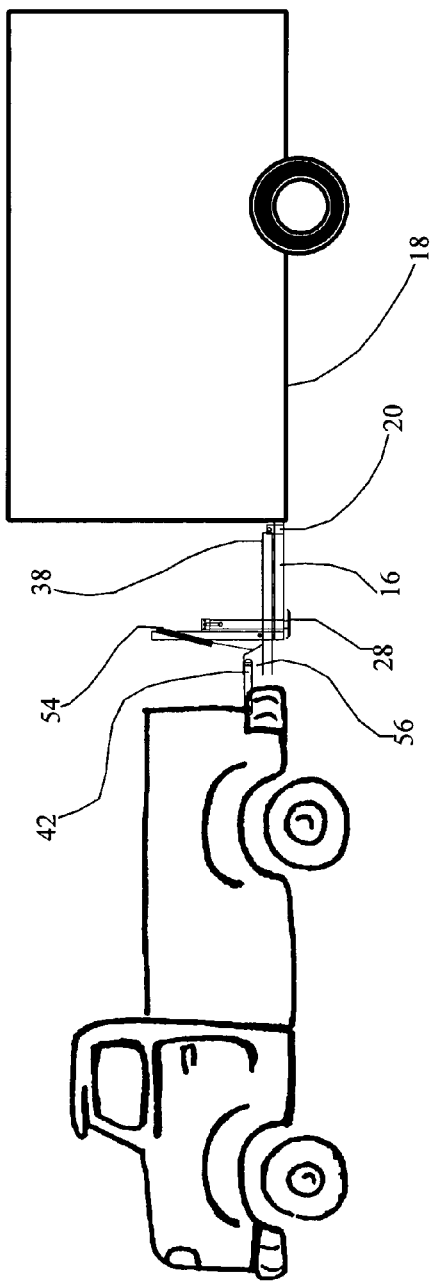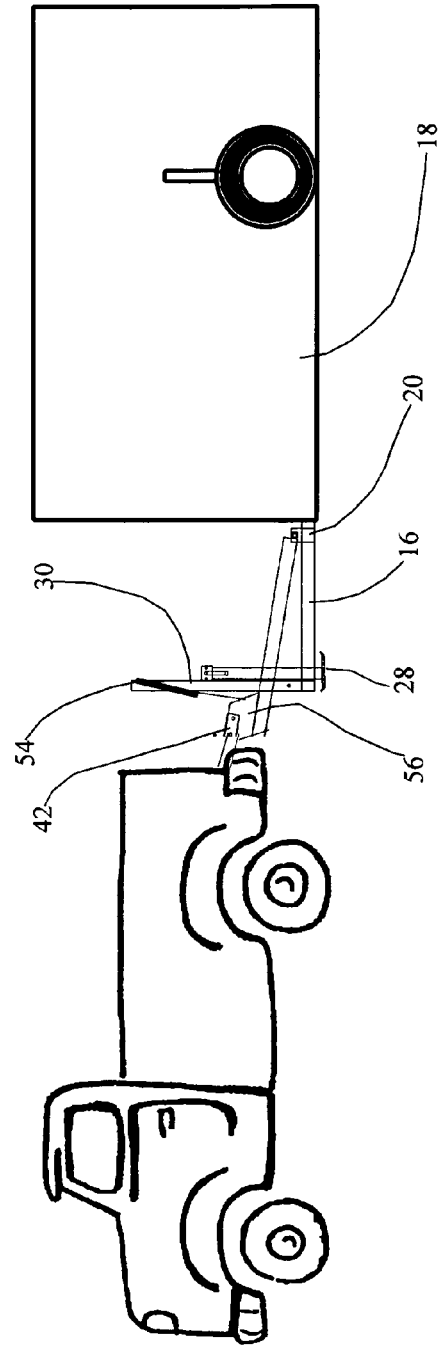

SCISSOR HITCH

BACKGROUND OF THE INVENTION

1. Field of the Invention

The present invention relates generally to ground-level loading trailers and particularly to a scissor hitch assembly which allows the ground-level loading trailer to remain attached to the towing vehicle when the trailer is in its lower or ground level position.

2. Description of Related Art

Several prior trailer designs for lowering to ground level from a raised travel position have been developed over the years and are known in the art. However, for such trailers to lower to ground level, the prior art trailers required the disconnecting of the trailer from the towing vehicle. The disconnecting of a trailer from a towing vehicle can often times be time consuming, physically taxing and dangerous.

SUMMARY OF THE INVENTION

The present invention provides a new and improved scissor hitch assembly for use with ground-level loading trailers. One of the square tubes comprising the scissor hitch assembly is attached to the front end of the trailer frame. A second section of square tubing is attached to the towing vehicle through a ball hitch coupler. The first and second sections of square tubing are attached at the midpoint of the first section of square tubing through a hinge bushing. The hinge bushing allows the sections of square tubing to rotate apart when the ground-level loading trailer is lowered. A pair of gas springs are used to allow the sections of square tubing to be easily and conveniently rotated together or apart. When traveling, a travel pin is inserted to preclude the rotation of the square tubing sections.

Accordingly it is the object of the present invention to provide a scissor hitch assembly which allows the ball hitch coupler to remain connected to the vehicle while the ground-level loading trailer is in its down position.

It is a further object of the present invention to provide such a scissor hitch assembly which can be used by a single individual by having a pair of gas springs to assist in lowering a portion of the scissor hitch assembly when the ground-level loading trailer is in the down or ground level position and for raising a portion of the scissor hitch assembly when the ground-level loading trailer is to be placed in its travel position.

It is a further object of this invention to provide a travel pin system for properly securing the scissor hitch assembly when in the travel position.

It is a further object of this invention to provide a compact and user friendly design.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated preferred embodiments of the invention.

BRIEF DESCRIPTION OF THE DRAWINGS

FIG. 3 is a front perspective view of the tongue jack, second spacer plate and first square tubing;

FIG. 4 is a front perspective view of the tower assist assembly showing the location of the first and second side plates, the top plate, the first ball pins, the gas springs, the travel pin, the first spacer plates, the first square tubing and the second square tubing when in the travel position;

FIG. 8 is a side perspective view of the scissor hitch with the first square tubing attached to a trailer and the ball hitch coupler attached to a towing vehicle when in the travel position; and FIG. 9 is a side perspective view of the scissor hitch with the first square tubing attached to a trailer and the ball hitch coupler attached to a towing vehicle when in the down position.

DETAILED DESCRIPTION OF THE PREFERRED EMBODIMENTS

Figure 1:
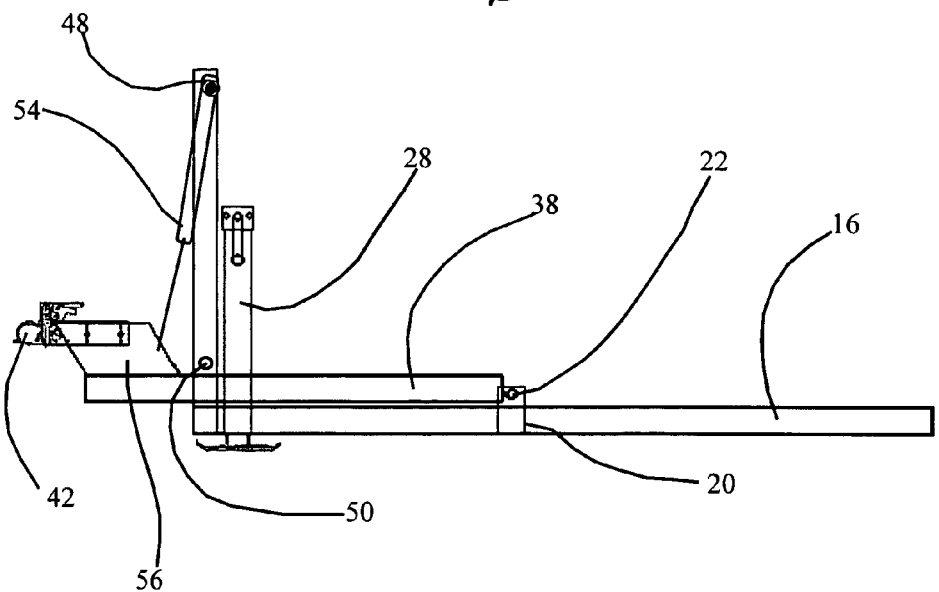
FIG. 1 is a side perspective view of the scissor hitch in its travel position with a riser.
Figure 2:
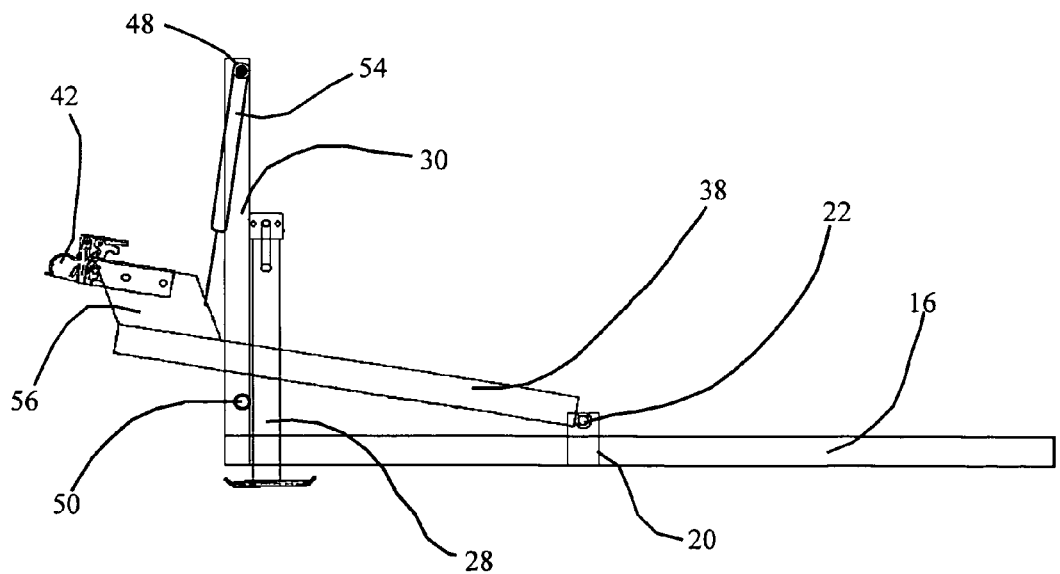
FIG. 2 is a side perspective view of the scissor hitch in its down position with a riser.
Figure 5:
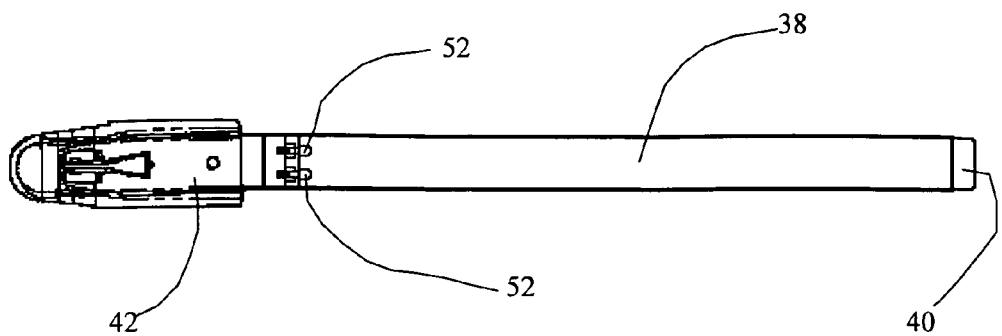
FIG. 5 is a top perspective view of the second square tubing, second ball pins, ball hitch coupler and the hinge bushing.
Figure 6:
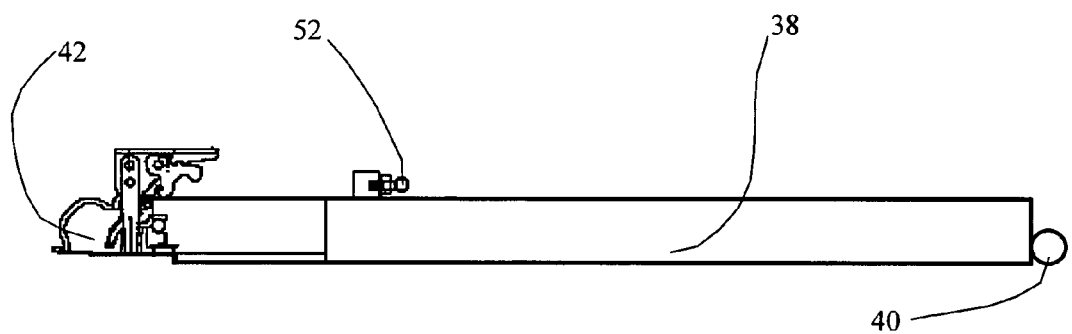
FIG. 6 is a side perspective view of the second square tubing, second ball pins, ball hitch coupler and the hinge bushing.

Referring to FIGS. 1 through 9, a scissor hitch assembly for use with a ground-level loading trailer which enables the ball hitch coupler to remain attached to a towing vehicle when a trailer is lowered to ground level.

The scissor hitch assembly consists of a piece of first square tubing 16 with a first end and a second end with the second end being fixedly attached to the front end of a trailer frame 18. A pair of hinge brackets 20 are fixedly attached to the sides of the first square tubing 16 approximately equal distance between the first end and the second end of the first square tubing 16. A portion of the hinge brackets 20 extend above the top side of the first square tubing 16. The portion of the hinge brackets 20 extending above the top side of the first square tubing 16 each have an opening 22.

A first pair of spacer plates 24 are fixedly attached to the sides of the first square tubing 16 near the first end. A second spacer plate 26 is fixedly attach to the side of the first square tubing 16 abutting the back end of one of the spacer plates from the first pair of spacer plates 24. A tongue jack 28 is fixedly attached to the second spacer plate 26.

A vertical power assist tower assembly which is comprised of a first elongated side plate 30, a second elongated side plate 32, and a top plate 34 with the top plate 34 being fixedly attached to the top ends of the first and second elongated side plates 30, 32. The bottom ends of the first and second elongated side plates 30, 32 traverse the first pair of spacer plates 24 with the first and second elongated side plates 30, 32 being fixedly attached to the first pair of spacer plates 24. An opening 50 in the first and second elongated side plates 30, 32 for insertion of a travel pin 36 is located slightly above the top end of the first pair of spacer plates 24.

Figure 7:
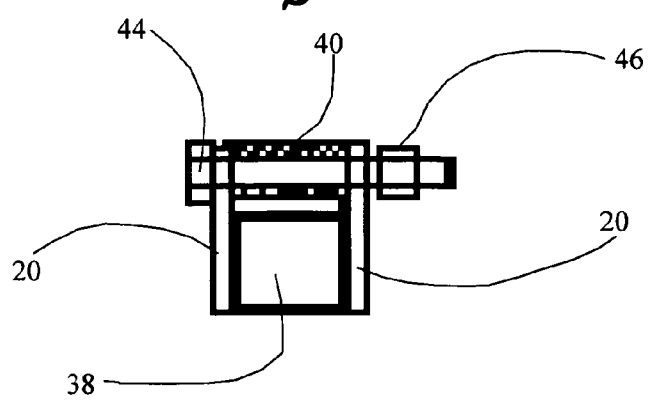
FIG. 7 is a partial exploded perspective view of the hinge brackets, the hinge bushing, the first square tubing and a bolt connecting the hinge brackets and the hinge bushing.

A piece of second square tubing 38 with a first end and a second end being of approximately the same dimensions as the first square tubing 16 has fixedly attached to the second end a cylindrical hinge bushing 40. Fixedly attached to the first end of the second square tubing 38 is a ball hitch coupler 42. A portion of the second square tubing 38 is placed in the opening between the first elongated side plate 30 and the second elongated side plate 32 with the hinge bushing 40 attached to the second square tubing 38 set between the openings 22 of the hinge brackets 20. As illustrated in FIG. 7, a bolt 44 is inserted through the first hinge bracket opening 22, through the hinge bushing 40 and out the second hinge bracket opening 22 and properly secured with a nut 46.

A pair of first ball pins 48 are fixedly attached to the inside of the first and second elongated side plates 30, 32 near the top plate 34 of the power assist tower assembly. A pair of second ball pins 52 are fixedly attached to the top side of the second square tubing 38 near the back end of the ball hitch coupler 42. Gas springs 54 are removably attached to the first and second ball pins 48, 52. Various sizes of gas springs 54 can be used to accommodate different trailer weights.

In certain circumstances, the towing vehicle have a higher-than-usual hitch resulting in the trailer traveling at a slant with the front end of the trailer being higher than the back end of the trailer. To resolve such a problem, a riser block can be incorporated into the scissor hitch by fixedly attaching a section of rectangular tubing 56 with a first open end, a second open end, a top side and a bottom side. Various sizes of rectangular tubing 56 can be used to accommodate the height of the towing vehicle's hitch. The first and second open ends of the rectangular tubing 56 are cut at forty-five degree angles and permanently sealed by fixedly attaching strap iron (not shown). The bottom side of the rectangular tubing 56 is fixedly attached to the top side of the second square tubing 38 and the ball hitch coupler 42 is fixedly attached to the top side of the rectangular tubing 56.

Upon reaching the desired destination, a single individual need only remove the travel pin 36 to allow the trailer to be lowered while the ball hitch coupler 42 remains connected to the towing vehicle. Upon removal of the travel pin 36, the gas springs 54 steadily lower the first square tubing 16 until the trailer attached to the first square tubing 16 is at ground level.

To travel, the trailer must be raised from ground level and the tongue jack 28 and first square tubing 16 must also be raised from ground level. To raise the tongue jack 28 and first square tubing 16, a single individual need only slightly lift the first square tubing 16 to a point at which it is below and parallel with the second square tubing 38. Once the first square tubing 16 and second square tubing 38 are contiguous and parallel, the travel pin 36 must be inserted into the openings 50 of the first and second elongated side plates 30, 32. The gas springs 54 assist in the raising of the first square tubing 16 and tongue jack 28 thereby requiring very little physical effort by an individual. After the travel pin 36 has been properly inserted, the trailer is ready to travel.

Various changes and departures may be made to the invention without departing from the spirit and scope thereof. Thus it is not intended that the invention be limited to what is described in the specification and illustrated in the drawings, rather only as set forth in the claims.

What is claimed is:

1. A scissor hitch assembly for use with a ground-level loading trailer comprising:
    a piece of first square tubing with a first end and a second end with the second end fixedly attached to the front end of a trailer frame;
    a pair of hinge brackets fixedly attached to the sides of the first square tubing approximately equal distance between the first end and the second end of the first square tubing with a portion of the hinge brackets extending above the top side of the first square tubing with openings on the portion of the hinge brackets extending above the top side of the first square tubing;
    a first pair of spacer plates fixedly attached to the sides of the first square tubing near the first end;
    a second spacer plate fixedly attached to the side of the first square tubing abutting the back end of a first pair of spacer plate and a tongue jack fixedly attached to the side of the second spacer plate;
    a vertical tower assembly which is comprised of a first elongated side plate, a second elongated side plate, and a top plate with the top plate being fixedly attached to the top ends of the first and second elongated side plates; and the bottom ends of the first and second elongated side plates traverse the first pair of spacer plates, with the first and second elongated side plates being fixedly attached to the first pair of spacer plates;
    a piece of second square tubing with a first end and a second end being of approximately the same dimensions as the first square tubing, fixedly attached to the second end a cylindrical hinge bushing and fixedly attached to the first end a ball hitch coupler;
    the second square tubing passes through the opening between the first elongated side plate and the second elongated side plate with the hinge bushing set between the openings of the hinge brackets and secured in place with a bolt and nut; and
    a opening in the first and second elongated side plates for insertion of a travel pin.

2. The apparatus according to claim 1 wherein gas springs are used to assist in the raising and lowering of the scissor hitch the gas spring having a first end and a second end with the first end of the gas spring being removably attached to a pair of first ball pins which first ball pins are fixedly attached to the elongated side plates and the second end of the gas springs which are removably attached to a pair of second ball pins which second ball pins are fixedly attached to the second square tubing, the size of the gas springs may vary depending upon the weight of the ground-level loading trailer.

3. The apparatus according to claim 1 wherein said ball hitch coupler for connecting the scissor hitch to a towing vehicle is fixedly attached to the first end of the second square tubing.

4. The apparatus according to claim 1 wherein the first and second square tubing are secured in said travel position by a travel pin which travel pin is inserted through the holes bored into the elongated side plates and thereby restricting the first and second square tubes from separating.

5. A scissor hitch assembly for use with a ground-level loading trailer comprising:
    a piece of first square tubing with a first end and a second end with the second end being fixedly attached to the front end of a trailer frame;
    a piece of second square tubing with a first end and a second end with the second end being connected to the top side of the first square tubing by means of a cylindrical hinge bushing which rotates within a pair of hinge brackets fixedly attached to the sides of the first square tubing;
    a ball hitch coupler fixedly attached to the first end of the second square tubing for connecting the scissor hitch to a towing vehicle;
    a first pair of spacer plates fixedly attached to the sides of the first square tubing near the first end;
    a second spacer plate fixedly attached to the side of the first square tubing abutting the back end of one of the first pair of spacer plates and a tongue jack fixedly attached to the side of the second spacer plate;
    a vertical tower assembly comprised of a first elongated side plate, a second elongated side plate, and a top plate with the top plate being fixedly attached to the top ends of the first and second elongated side plates and the bottom ends of the first and second elongated side plates fixedly attached to the first pair of spacer plates;

an opening in the first and second elongated side plates for insertion of a travel pin; and a pair of first ball pins fixedly attached to the inside of the first and second elongated side plates near the top plate and a pair of second ball pins fixedly attached to the second square tubing with gas springs removably attached to the pair of first and second ball pins.

6. The apparatus according to claim 5 wherein the first and second square tubing are secured in a travel position by a travel pin which travel pin is inserted through the holes bored into the elongated side plates and thereby restricting the first and second square tubes from separating.

7. A scissor hitch assembly for use with a ground-level loading trailer comprising:

a piece of first square tubing with a first end and a second end with the second end being fixedly attached to the front end of a trailer frame;

a piece of second square tubing with a first end and a second end with the second end being connected to the top side of the first square tubing by means of a cylindrical hinge bushing which rotates within a pair of hinge brackets fixedly attached to the sides of the first square tubing;

a section of rectangular tubing with a first open end, a second open end at forty-five degree angles and the bottom side fixedly attached to the top side of the second square tubing;

a ball hitch coupler fixedly attached to the to the top side of the rectangular tubing;

a first pair of spacer plates fixedly attached to the sides of the first square tubing near the first end;

a second spacer plate fixedly attached to the side of the first square tubing abutting the back end of one of the first pair of spacer plates and a tongue jack fixedly attached to the side of the second spacer plate;

a vertical tower assembly comprised of a first elongated side plate, a second elongated side plate, and a top plate with the top plate being fixedly attached to the top ends of the first and second elongated side plates and the bottom ends of the first and second elongated side plates fixedly attached to the first pair of spacer plates;

an opening in the first and second elongated side plates for insertion of a travel pin; and a pair of first ball pins fixedly attached to the inside of the first and second elongated side plates near the top plate and a pair of second ball pins fixedly attached to the back side of the rectangular tubing with gas springs removably attached to the pair of first and second ball pins.

8. The apparatus according to claim 7 wherein the first and second square tubing are secured in a travel position by a travel pin which travel pin is inserted through the holes bored into the elongated side plates and thereby restricting the first and second square tubes from separating.

* * * * *